United States Patent
McKinney

(10) Patent No.: US 7,979,279 B1
(45) Date of Patent: Jul. 12, 2011

(54) SYSTEM AND METHOD FOR MONITORING COMMUNICATIONS

(75) Inventor: Vicki Karen McKinney, Thousand Oaks, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2214 days.

(21) Appl. No.: 10/747,370

(22) Filed: Dec. 30, 2003

Related U.S. Application Data

(60) Provisional application No. 60/487,990, filed on Jul. 17, 2003.

(51) Int. Cl.
*G10L 15/04* (2006.01)

(52) U.S. Cl. ......... 704/251; 704/246; 704/247; 704/252

(58) Field of Classification Search .................. None
See application file for complete search history.

(56) References Cited

U.S. PATENT DOCUMENTS

| | | | |
|---|---|---|---|
| 5,351,287 A * | 9/1994 | Bhattacharyya et al. | 379/93.02 |
| 6,411,683 B1 * | 6/2002 | Goldberg et al. | 379/88.01 |
| 6,963,357 B2 * | 11/2005 | Semones | 348/143 |
| 7,174,191 B2 * | 2/2007 | Doble | 455/563 |
| 2002/0021791 A1 * | 2/2002 | Heilmann et al. | 379/189 |
| 2004/0029564 A1 * | 2/2004 | Hodge | 455/411 |
| 2004/0037397 A1 * | 2/2004 | Roby | 379/88.01 |
| 2004/0116842 A1 * | 6/2004 | Mardirossian | 604/1 |
| 2004/0131160 A1 * | 7/2004 | Mardirossian | 379/38 |

OTHER PUBLICATIONS

Wiretapping/Eavesdropping on Telephone Conversations: Is There Cause for Concern? http://www.privacyrights.org/fs/fs9-wrtp.htm, Mar. 2004.

\* cited by examiner

*Primary Examiner* — Leonard Saint Cyr
(74) *Attorney, Agent, or Firm* — Hope Baldauff Hartman, LLC

(57) ABSTRACT

A system and method for providing enhanced security through the monitoring of communications. In one embodiment, the monitoring process is aided through an automatic speech recognition process that is focused on the recognition of words from a limited vocabulary.

17 Claims, 1 Drawing Sheet

SYSTEM AND METHOD FOR MONITORING COMMUNICATIONS

The present application claims priority to provisional patent application No. 60/487,990, entitled "Homeland Ear," filed Jul. 17, 2003, which is incorporated herein by reference in its entirety.

BACKGROUND

1. Field of the Invention

The present invention relates generally to security systems and methods and more particularly to the automatic monitoring of communications using speech recognition technology.

2. Introduction

The issue of national security has been brought to the forefront of public consciousness in the United States. While terrorist activities have persisted abroad, those activities have now produced major effects within the United States. At this point, it is not difficult to recognize the importance of protecting the national defense through a substantial role by intelligence agencies and security services. One of the primary tools of intelligence agencies and security services is the gathering of information about foreign policy and national defense issues. This information gathering also enables investigation into criminal activities by individuals or groups that may operate in a domestic or international framework. Tracking these individuals or group of individuals requires substantial efforts in sifting through available forms of information. What is needed therefore is a mechanism to assist intelligence agencies and security services in assessing potential national security issues.

SUMMARY

In accordance with the present invention, a system and method is provided for enhancing security through the monitoring of communications. In one embodiment, the monitoring process is aided through an automatic speech recognition process that is focused on the recognition of words from a limited vocabulary.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
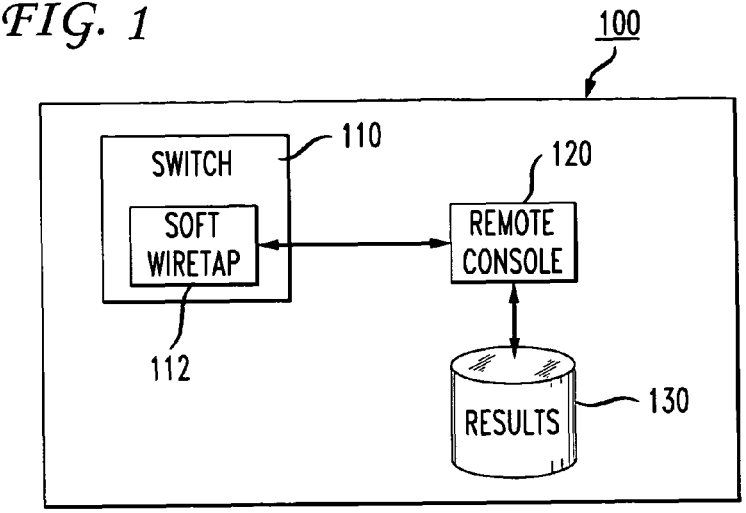
FIG. 1 illustrates an embodiment of a system of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

One of the primary areas of intelligence gathering involves the monitoring of communications channels. One example of a communication channel is a voice communication channel that can be embodied in various forms such as standard telephony communications, cellular communications, Internet telephony communications, satellite communications, or the like. Another example of a communication channel is a digital data communication channel that can be embodied in various forms such as e-mail communication, file transfer communication, data exchange communication, or any other general data transfer protocol.

As would be appreciated, monitoring these various forms of communications can represent a substantial burden. Where a particular individual or group of individuals is suspected of some illegal activity, a targeted set of communication channels can be identified for monitoring. This represents a manageable task, a task that is unfortunately dependent on foreknowledge of potential illegal activity. In one sense, this stage of monitoring is the end result of substantial previous efforts in intelligence gathering.

It is a feature of the present invention that communication channel monitoring efforts can be applied on a large scale without the benefit of substantial prior intelligence gathering efforts. In one aspect, the principles of the present invention can be used as an initial intelligence-gathering tool, the results of which can be used to generate a later more targeted monitoring process.

As will be described in greater detail below, one area where the principles of the present invention can be applied is in the monitoring of voice communication channels. Unlike typical data communication channels that transmit binary encoded text, voice communication channels are based on analog or digital representations of actual voice signals. Analysis of this form of communication channel is therefore a significantly more difficult proposition.

Historically, voice communication channels such as a standard wired telephony channel were monitored through wiretapping. While wiretapping has been used by police and other government entities for many years, their authority in access and use of the wiretapped information has been a continuing issue before the courts. Law enforcement entities generally require a court order to listen in on private conversations, and are limited in their use of the information in court. Further, court orders are typically not unlimited, but rather are confined to a specified length of time.

Even under these court-mandated controls, the practice of wiretapping by law enforcement officials remains highly controversial. Here, the judicial system has had to moderate the competing interests between law enforcement officials and civil liberties advocates. As threats of terrorism continue to escalate, government entities such as the U.S. Department of Homeland Security may be given broader and more sweeping authority to monitor communications.

It is a feature of the present invention that monitoring of communication channels can be performed while minimizing a perceived invasion to individual privacy. To illustrate various principles of the present invention, reference is made first to the example system diagram of FIG. 1.

As illustrated, monitoring system 100 includes a switch 110 that is operative to route information amongst various communication channels passing through switch 110. As would be appreciated, the specific nature of switch 110 would be implementation dependent. For example, in one embodiment relating to conventional public switched telephone networks (PSTN), switch 110 could represent a Local Exchange Carrier (LEC) switch, an Interexchange Carrier (IXC) switch, a Private Branch Exchange (PBX), or the like. In an embodiment relating to wireless telephony networks, switch 110 could represent stations that relay mobile-phone calls. In an embodiment relating to satellite networks, switch 110 could represent the satellite station that relays satellite communications. In an embodiment relating to Internet networks, switch 110 could represent a Local Area Network (LAN) or Wide Area Network (WAN) router. In general, switch 110 can represent any communication element through which a plurality of communications channels passes.

As further illustrated in FIG. 1, switch 110 includes soft wiretap component 112. In general, soft wiretap 112 is a form of phone tap that is operative to analyze channel information as it passes through switch 110. Soft wiretap 112 can be built into switch 110 to thereby enable programmatic selection of communication channels passing through switch 110 that should be monitored.

In one embodiment, signals from the selected communication channel(s) are forwarded to remote console 120 for monitoring purposes. Results from the monitoring process can then be stored in results database 130. It should be noted that in an alternative embodiment, soft wiretap 112 can be designed to perform some level of monitoring analysis, with the results of that analysis being stored in results database 130 directly or through remote console 120.

In the illustrated embodiment, soft wiretap 112 is built into switch 110. In one embodiment, soft wiretap 112 can be external to switch 110. For example, in an Internet environment, soft wiretap 112 can be embodied as a packet sniffer. This packet sniffer would be operative to monitor information passing over the network to which the packet sniffer is connected. As data streams back and forth on the network, the program looks at, or "sniffs," each packet.

Normally, a computer only looks at packets addressed to it and ignores the rest of the traffic on the network. When a packet sniffer is set up it can be programmed to look at everything that comes through. The amount of traffic largely depends on the location of the packet sniffer in the network. Thus, if the packet sniffer is located on a LAN, only a small amount of traffic will be monitored. Conversely, if the packet sniffer is located near a major routing hub such as one of the MAE East Internet exchange facilities in the Washington, D.C. metro area, then the packet sniffer will have access to an extremely large amount of Internet traffic.

Having described some of the basic elements of the example system of FIG. 1, a description of a monitoring process is now described with reference to the flowchart of FIG. 2. As illustrated, the monitoring process begins at step 202 where a set of communication channels is identified for monitoring.

In one scenario, this set of communication channels represents a subset of a total number of communications channels that are passing through switch 110. As noted above, one of the goals of the monitoring process is to perform an early stage information gathering process, the results of which can be used in a more targeted information gather process. As such, the number of communication channels likely to be monitored would be fairly expansive as compared to a focused wiretap surveillance program.

As would be appreciated, the methodology by which the set of communication channels is selected would be dependent on the goals of the monitoring program. For example, instead of having a nationwide focus that would be unjustified in view of the resources required, the monitoring program could focus on a particular location, area, organization, or any other logical metric that would enable a more targeted monitoring process. For wired communication channels, a focus on a particular area would likely dictate that a particular switch serving that area would be the focus. For wireless communication channels, a focus on a particular location could be based on tracking data within the wireless communication system. For example, mobile phones can be tracked based on cell site antenna location information, or more detailed real-time tracking data generated by systems conforming to more recent mobile E911 requirements.

After the set of communication channels is identified, at step 204, soft wiretaps 112 are programmed by remote console 120 to monitor the identified set of communication channels. As would be appreciated, this programming process can occur regardless of whether the communication channel actually exists at the time soft wiretap 112 is programmed. For example, a wired communication channel representing a standard PSTN residence line would be in existence prior to it being tapped. Wireless or packetized communication channels, on the other hand, represent intermittent connections that could be dynamically identified and tapped upon their use. Here, the search process can be based on the number, the location, address, or any other parameter that is used in the identification process of step 202.

Once the soft wiretaps 112 have been programmed, signals from the identified communication channels can be transmitted, at step 206, to remote console 112 for monitoring analysis. Here, these transmitted signals represent voice signals that embody a conversation being held on the particular communication channel. In various embodiments, these transmitted signals can be analog signals or digital signals (e.g., pulse code modulation signals).

Unlike digital data representing textual information, the voice signals being transmitted to remote console 120 represent information that must be further processed prior to analysis. This, of course, assumes that the replayed conversation in and of itself is not particularly usable in a scalable automatic process.

In accordance with the present invention, the voice signals that are being analyzed at step 208 are subjected to a quick pass automatic speech recognition (ASR) process that operates near real time. In general, ASR processes tradeoff speed for word recognition accuracy. For example, an ASR process that operates near real time may generate only a 65% word accuracy rate, while an ASR process that operates at four times real time may generate a 77% word accuracy rate. As would be appreciated, the particular word accuracy rates that are being achieved would be dependent on the quality of the data used to train the language and acoustic models of the ASR process.

It is a feature of the present invention that the provision of an ASR process that operates near real time enables the monitoring system to operate in environments having limited storage capacity. A limited storage environment can be accommodated because the ASR process is capable of keeping up with the data that is being generated by the communication channel. A failure to substantially match the rate at which the data is being generated will result in a large backlog of data that must be analyzed. The rate of growth of this backlog data will be substantial as the process scales to the monitoring of a large number of communication channels. As would be appreciated, the rate of operation of the ASR process can be reduced in those environments or monitoring situations where storage capacity is not an issue.

To achieve an ASR process that operates near real time, the ASR process is further focused to concentrate on a recognition of only those words necessary to enable a detection of an occurrence of words in a limited vocabulary. As the monitoring process is focused on issues of law enforcement, this limited vocabulary can include words such as bombs, drugs, assassinate, etc. Known or suspected code words or code phrases could also be the focus of the ASR process. In an additional embodiment, a search could also be performed on particular vocal characteristics to effect a form of voice print recognition. This would provide a speaker identification process over the selected set of communications channels, thereby enabling the monitoring and tracking of targeted individuals.

Figure 2:
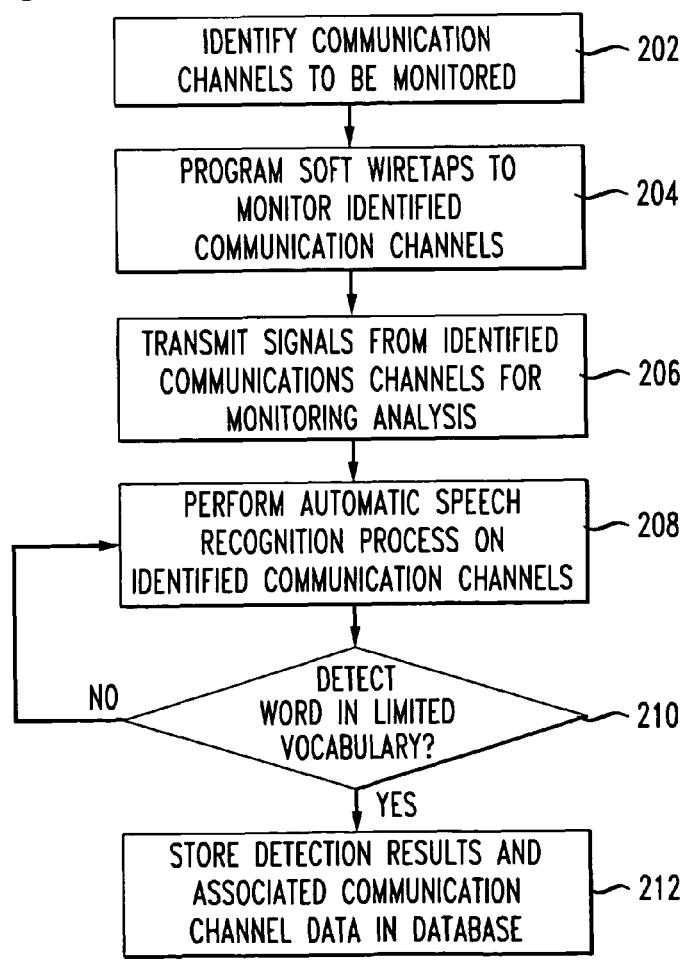
FIG. 2 illustrates an embodiment of a method of the present invention.

As illustrated in FIG. 2, the ASR process continues until a word from the limited vocabulary is detected at step 210. If a word from the limited vocabulary is detected, then at step 212 the detected word is stored in results database 130. If it is the first occurrence of the detected word from the limited vocabulary for that particular communication channel, then data associated with that communication channel is also stored in results database 130. Here, the data associated with the communication channel can represent a calling party number, a called party number, an IP address, a geographic location, a geographic area, or any other parameter related to the identification process of step 202. If it is a second or later occurrence of a detected word from the limited vocabulary for that particular communication channel, then the additional data can be added to the previous data stored in results database 130.

As illustrated in the embodiment of FIG. 2, the data associated with the communication channel need not be retrieved until a word from the limited vocabulary is detected. This sequence serves to reduce the amount of privacy data that is being recorded in the monitoring process. Indeed, for the vast majority of monitored communications that yield no detected words from the limited vocabulary, all of the data associated with that communication can be deleted once the ASR process has finished. No record of the monitored communication needs to be kept.

To further enhance privacy efforts, results database 130 can also be designed to include only the portions of the conversation relating to the detection of one or more words from the limited vocabulary. This stored portion would enable a review of the accuracy of the detection to thereby minimize the false positives generated by the system. By minimizing the amount of information being stored in results database 130, privacy is enhanced. Indeed, if one of the goals of the monitoring system is to perform early stage information gathering, then the statistics generated by the monitoring process may be more useful as compared to the monitored information itself. If the early stage information gathering produces significant results then further more intrusive information gathering can be obtained upon a court order.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

While the invention has been described in detail and with reference to specific embodiments thereof, it will be apparent to one skilled in the art that various changes and modifications can be made therein without departing from the spirit and scope thereof. For example, in one embodiment ASR functionality can be integrated into soft wiretap 112 to thereby produce a monitoring function integrated with switch 110. Thus, it is intended that the present invention covers the modifications and variations of this invention provided they come within the scope of the appended claims and their equivalents.

What is claimed is:

1. A method for monitoring a communications channel, the method comprising:
   identifying, the communications channel to be monitored;
   executing, at a processor, an automatic speech recognition process on voice communication signals on the communications channel, the automatic speech recognition process being executed to determine whether a word from a limited vocabulary is recognized in the voice communications signals on the communications channel;
   in response to determining that the word from the limited vocabulary is recognized in the voice communications signals on the communications channel, storing, data indicating the word recognized in the voice communications signals on the communications channel and data associated with the voice communications signals on the communications channel;

in response to determining that the word from the limited vocabulary is not recognized in the voice communications signals on the communications channel, not storing the data associated with the communications signals on the communications channel;

determining whether recognition of the word from the limited vocabulary is a first occurrence for the communications channel; and in response to determining that the recognition of the word from the limited vocabulary is a repeat occurrence for the communications channel, storing additional data indicating the repeat occurrence of the word in the voice communications signals on the communications channel.

2. The method of claim 1, wherein identifying the communications channel to be monitored is based upon a geographic location associated with the voice communications signals.

3. The method of claim 2, wherein identifying the communications channel to be monitored is based upon determining that the geographic location corresponds to an area in which criminal activity is suspected.

4. The method of claim 1, wherein the limited vocabulary comprises a word associated with criminal activity.

5. The method of claim 1, wherein the data associated with the voice communications signals on the communications channel comprises a calling party number, a called party number, an Internet Protocol address, and a geographic location associated with the voice communication signals.

6. The method of claim 1, wherein the automatic speech recognition comprises a quick pass automatic speech recognition process.

7. The method of claim 1, further comprising identifying a calling party associated with the voice communications signals based upon vocal characteristics associated with the calling party and the voice communications signals.

8. The method of claim 1, further comprising identifying a location of a calling party.

9. A method for assessing security threats, the method comprising:

identifying, a communications channel to be monitored, wherein identifying the communications channel to be monitored is based, at least in part, on a security risk factor;

executing, at a processor, an automatic speech recognition process on voice communication signals on the communications channel, the automatic speech recognition process being executed to determine whether a word from a limited vocabulary is recognized in the voice communications signals on the communications channel;

in response to determining that the word from the limited vocabulary is recognized in the voice communications signals on the communications channel, retrieving identification information associated with the voice communications signals on the communications channel, and storing data indicating the word recognized in the voice communications signals on the communications channel and the identification information;

in response to determining that the word from the limited vocabulary is not recognized in the voice communications signals on the communications channel, not storing data associated with the voice communications signals on the communications channel;

determining whether recognition of the word from the limited vocabulary is a first occurrence for the communications channel; and in response to determining that the recognition of the word from the limited vocabulary is a repeat occurrence for the communications channel, storing additional data indicating the repeat occurrence of the word in the voice communications signals on the communications channel.

10. The method of claim 9, wherein identifying a communications channel to be monitored is based upon a geographic location associated with the voice communications signals.

11. The method of claim 10, wherein identifying the communications channel to be monitored is based upon determining that the geographic location corresponds to an area in which criminal activity is suspected.

12. The method of claim 9, wherein the limited vocabulary comprises a word associated with criminal activity.

13. The method of claim 9, wherein the automatic speech recognition process comprises a quick pass automatic speech recognition process.

14. The method of claim 9, wherein the identification information comprises an Internet Protocol address of a device associated with the voice communications signals.

15. The method of claim 9, wherein the identification information comprises a geographic location associated with the voice communications signals.

16. A system for assessing security threats, the system comprising: a data storage device storing a program for assessing security threats; and a processor, in communication with the memory device, the processor being configured to execute the program at least to:

identify a communications channel to be monitored, wherein identifying the communications channel to be monitored is based, at least in part, upon a security risk factor;

execute a quick pass automatic speech recognition process on voice communication signals on the communications channel, the quick pass automatic speech recognition process being executed to determine whether a word from a limited vocabulary is recognized in the voice communications signals on the communications channel, obtain identification information associated with the voice communications signals on the communications channel, the identification information comprising data indicating at least one entity associated with the voice communication signals and a geographic location associated with the voice communication signals, store data indicating the word recognized in the voice communications signals on the communication channel and the identification information in response to determining that the word from the limited vocabulary is recognized in the voice communications signals on the communications channel, delete the identification information, in response to determining that the word from the limited vocabulary is not recognized in the voice communications signals on the communications channel;

determine whether recognition of the word from the limited vocabulary is a first occurrence for the communications channel; and in response to determining that the recognition of the word from the limited vocabulary is a repeat occurrence for the communications channel, store additional data indicating the repeat occurrence of the word in the voice communications signals on the communications channel.

17. A method of wiretapping, the method comprising:
performing, at a processor, an automatic speech recognition process on a plurality of communications channels, the automatic speech recognition process being performed to determine whether a word from a limited vocabulary is recognized in voice communication signals associated with the plurality of communications channels;
selecting, at the processor, a communications channel of the plurality of communications channels for further analysis in response to determining that the word from the limited vocabulary is recognized in the voice communications signals on the communications channel of the plurality of communications channels;
in response to determining that the word from the limited vocabulary is not recognized in the voice communications signals on the plurality of communications channels channel, not storing data associated with the communications signals on the plurality of communications channels;
determining whether recognition of the word from the limited vocabulary is a first occurrence for the communications channel;
in response to determining that recognition of the word from the limited vocabulary is the first occurrence for the communications channel, storing data indicating the word recognized in the voice communications signals on the communications channel and data associated with the voice communications signals on the communication channel; and
in response to determining that the recognition of the word from the limited vocabulary is a repeat occurrence for the communications channel, storing additional data indicating the repeat occurrence of the word in the voice communications signals on the communications channel.

* * * * *